United States Patent [19]

Rawyler-Ehrat

[11] 4,242,076

[45] Dec. 30, 1980

[54] PROCESS OF COMBUSTION

[76] Inventor: Ernst Rawyler-Ehrat, Kometsträsschen 40, Schaffhausen, Switzerland

[21] Appl. No.: 973,842

[22] Filed: Dec. 28, 1978

[30] Foreign Application Priority Data

Jan. 3, 1978 [CH] Switzerland ............... 45784/78

[51] Int. Cl.³ .............................................. F23J 7/00
[52] U.S. Cl. ...................................... 431/4; 431/215
[58] Field of Search ................. 431/215, 190, 163, 4

[56] References Cited

U.S. PATENT DOCUMENTS

| | | | |
|---|---|---|---|
| 2,975,594 | 3/1961 | Eastman | 431/4 |
| 3,792,688 | 2/1974 | Grainger | 431/215 |
| 3,907,488 | 9/1975 | Takahashi et al. | 431/4 |
| 4,089,639 | 5/1978 | Reed et al. | 431/4 |
| 4,110,973 | 9/1978 | Haefuch et al. | 431/4 |
| 4,152,374 | 5/1979 | Wenger et al. | 431/4 |
| 4,173,449 | 11/1979 | Israel | 431/4 |

*Primary Examiner*—Joseph Man-Fu Moy
*Attorney, Agent, or Firm*—Karl W. Flocks

[57] ABSTRACT

In a process of combustion comprising forming a mixture of fresh air and a compound of hydrocarbons, water vapor is added to the mixture prior to its combustion. In order to promote the dissociation of $H_2$ and $O_2$ there is arranged a catalytic agent.

8 Claims, 4 Drawing Figures

PROCESS OF COMBUSTION

BACKGROUND OF THE INVENTION

1. Field of the Invention

The present invention relates to an improved method of combusting a mixture of air and hydrocarbons in a combustion chamber.

Such combustion chamber is to be understood as to be defined by a cylinder and piston arrangement of an internal combustion motor operating in accordance with the Otto process or Diesel process. The combustion chamber is also to be understood as a combustion chamber of a gas turbine installation, of a part of the fossil fired boiler or furnace, resp. of thermal power plants, and of a boiler for heating and/or generating hot water for household use, in apartments and business buildings, etc.

It is generally known in the art that the classical combustion of hydrocarbons such as e.g. fuel oil, gasoline, petrol, butane, propane, etc. is based on a as fine as possible atomization of the hydrocarbon particles in air.

The waste gases formed e.g. during the combustion of fuel oil contain in case of a stoichiometric combustion theoretically exclusively carbon dioxide ($CO_2$), water vapor ($H_2O$), sulphur dioxide ($SO_2$) as well as nitrogen ($N_2$), latter being part of the fresh air necessary for such combustion.

2. Description of the Prior Art

In practice, it is however not possible to achieve aforementioned ideal conditions because in spite or as a result, resp. of the combustion with air the exhaust gases emanating from such combustion contain unburned and partially burned fractions, such as carbon (C) in form of soot, carbon monoxide (CO) and various olefins as well as more highly oxidized substances, such as sulphur trioxide ($SO_3$) and nitrogen hexoxide ($NO_3$) and, furthermore, ashes formed by impurities and also residual oxygen ($O_2$).

According to a generally known method the fuel is mixed with water such to form an emulsion, yielding an improved combustion. However, there must be observed specific conditions when mixing the combustion air with such emulsion.

Such method is an improvement over the process with no addition of water, is however still not quite satisfactory with regard to heat produced and pollution control.

SUMMARY OF THE INVENTION

Hence, it is an object of the invention to provide an improved process in which less fuel is required to produce a given amount of heat and in which the discharge of pollutants is reduced.

This and other objects, which will become more apparent as the description proceeds, is achieved in that water vapor is added to the mixture prior to the combustion thereof.

Due to the fact that water vapor contains approximately 89% oxygen ($O_2$) and approximately 11% hydrogen ($H_2$) the combustion can be considerably improved because in contrast to air which contains only approximately 21% oxygen and approximately 78% nitrogen, water vapor has almost no constituents which inhibit combustion.

Preferably catalysts are used for the combustion in order to promote the dissociation of the water vapor into $H_2$ and $O_2$. Many catalysts are suitable for this purpose and may be chosen in accordance with the prevailing conditions in a combustion chamber such as temperature and pressure and also taking costs into consideration. Graphite and/or iron sponge and molybdenum compounds have proven to be especially advantageous catalysts. Further preferred catalysts are metal oxide and/or metal hydroxide, and also platinum sponge.

The water vapor is preferably produced in a waste heat boiler by utilizing the waste heat produced in the combustion process. The quantity of the water vapor is advantageously controlled.

BRIEF DESCRIPTION OF THE DRAWINGS

The present invention will be more fully understood by reference to the following detailed description thereof, when read in conjunction with the attached drawings, wherein.

Referring now to the drawings, in which like elements are indicated by like reference numerals, there is shown in FIG. 1 a first preferred embodiment of the invention as applied in a diesel engine process.

Figure 1:
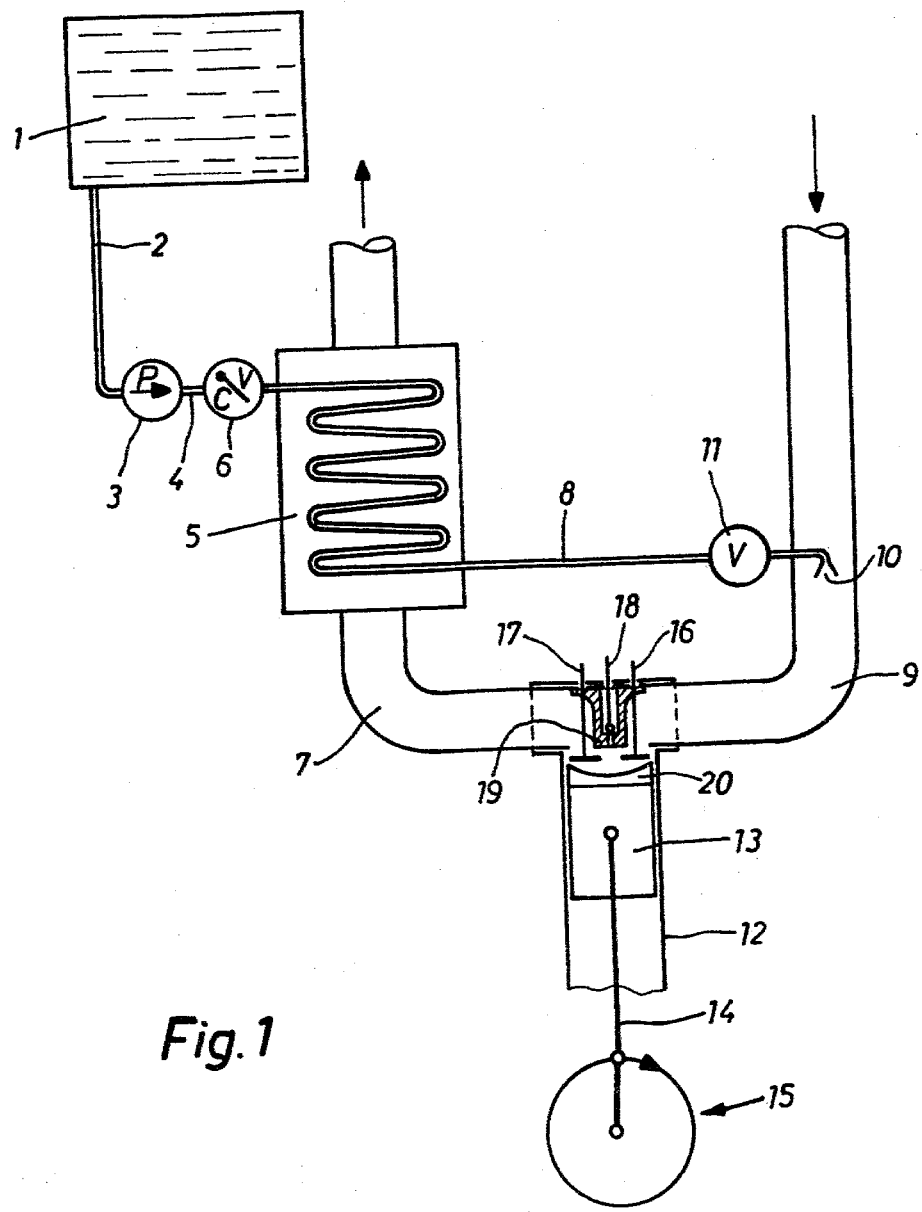
FIG. 1 is a schematic diagram of a preferred application of the inventive method in a diesel engine process.

For sake of clearness only one cylinder 12, its piston 13, piston rod 14 and crank-shaft 15 are very schematically shown.

Furthermore, there is shown schematically an inlet valve 16, an exhaust valve 17, as well as typically for a diesel engine a fuel inlet valve 18 arranged in a fuel inlet nozzle 19. It shall be noted that no essential modifications of such engines are necessary. A water tank 1 contains a supply of water, which water tank 1 is connected by means of a discharge pipe 2 to a conventional water pump 3 driven by means generally known in the art and thus not particularly shown and described. The water pump 3 is connected by means of a delivery pipe 4 to a heat exchanger 5. A non-return valve 6 is arranged at the delivery side of pump 3. The water leaving said check valve 6 enters a heat exchanger 5 connected to the exhaust pipe 7 mounted to cylinder 12. Accordingly, the water flowing through heat exchanger 5 will be heated by the waste heat of the exhaust gases which are exhausted through the exhaust pipe 7 and conclusively is converted into water vapor. This water vapor leaves the heat exchanger 5 via pipe 8. In pipe 8 there is arranged a control valve 11 with which the quantity of water vapor flowing therethrough is regulated. Thereafter, the water vapor enters a nozzle 10 arranged in the intake manifold 9 of the diesel engine.

Now, this water vapor introduced in manifold 9 and thus into the cylinder 12 contains approximately 89% oxygen ($O_2$), approximately 11% hydrogen ($H_2$) and specifically no nitrogen ($N_2$). Accordingly, considerably more oxygen is available to the flame of the combustion.

The dissociation of the water vapor into $H_2$ and $O_2$ is promoted by the presence of a catalyst.

In the present example use is made of the fact that in the presence of glowing carbon the dissociation of water vapor occurs already at temperatures in the range of 400°–800° C. (750°–1470° F.), thus providing a great quantity of active oxygen to activate the combustion process.

Such catalysts are provided in the form of a body of graphite and/or iron sponge, of a molybdenum compound, of a metal oxide and/or metal hydroxide, or of platinum sponge, depending on prevailing conditions such as temperatures in the combustion chamber.

In the preferred embodiment shown in FIG. 1 such body 20 is part of the piston head, whereby the connection between body 20 and piston 13 is of any common form, such as e.g. a mechanical connection, a welding, a sprayed-on surface layer etc. as generally known in the art.

Figure 2:
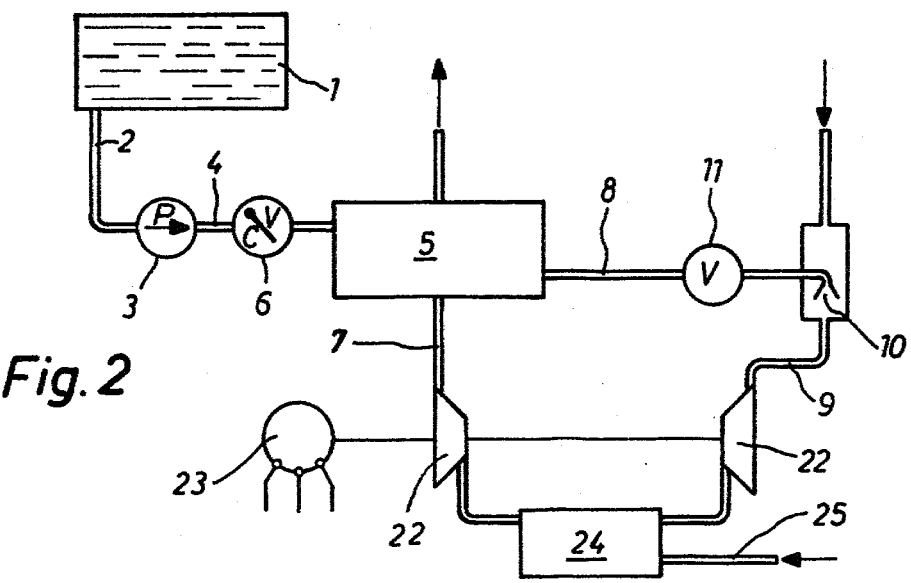
FIG. 2 is a schematic diagram of a preferred application of the inventive method in an open-cycle gas turbine process.

A further preferred embodiment of the invention is shown in FIG. 2, whereby an open-cycle gas turbine process is shown.

Again, there is shown as in FIG. 1 the water tank 1, its discharge pipe 2, the water pipe 3, the delivery line 4 including the check valve 6, further the heat exchanger 5 and flow control valve 11 in pipe 8. There is generally shown schematically a gas turbine generator arrangement comprising mainly the air compressor 21, the gas turbine 22, the electrical generator 23, the combustion chamber 24 and fuel supply 25.

Here, the nozzle 10 for introduction of the water vapor generated as in the embodiment of FIG. 1 by the waste heat of the exhaust gases 7 leaving turbine 22 and entering the heat exchanger 5 is arranged in the air intake line 10 of the gas turbine generator.

In case of a gas turbine installation, of a boiler of a thermal power station, of a boiler for the production of domestic heat and hot water the water vapor must not necessarily be introduced in the fresh air line considerably upstream of the combustion chamber.

Figure 3:
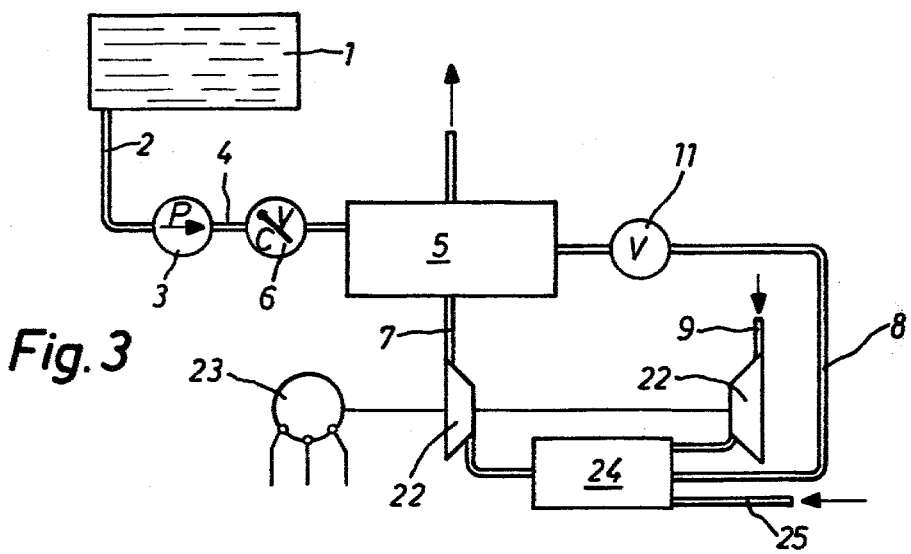
FIG. 3 is a schematic diagram of a modification of the application of FIG. 2.

As shown by the example of FIG. 3, depicting basically the same gas turbine generator as shown in FIG. 2 and carrying corresponding reference numerals the pipe 8 carrying the water vapor is led directly into the combustion chamber 24 of the gas turbine apparatus and not into its air intake line 9.

Figure 4:
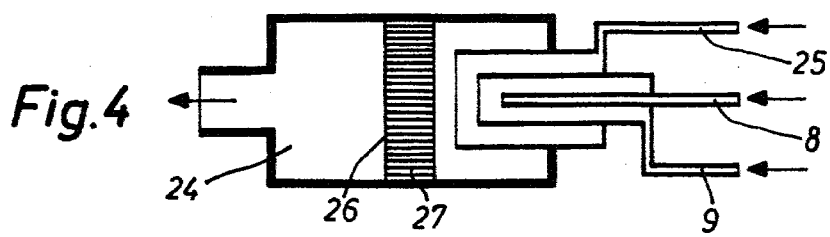
FIG. 4 is a schematic diagram of a preferred arrangement of a catalyst in a combustion chamber.

In FIG. 4 there is shown a preferred arrangement of the body formed of the catalyst. This arrangement is applicable to the combustion chamber of a gas turbine, to domestic boilers as well as burners for boilers or furnaces of power plants. Furthermore, it is assumed that the water vapor is fed by a separate line as in the embodiment of FIG. 3.

There is shown in FIG. 4 a combustion chamber 24 having a multiple burner arrangement including a vapor feed line 8, a fresh air feed line 9 and a fuel feed line 25. These lines are shown to enter concentrically into the combustion chamber 24. It is, however, to be understood that the arrangement and succession of the various pipes or these nozzle ends, resp. is only exemplary and many other arrangements are possible and may be contemplated.

The body 26 of the catalyst is shown here to comprise a plurality of plates 27 extending in the direction of flow in the combustion chamber 24. Alternatively, such body 26 may be also featuring the form of a grid inserted into the combustion chamber 24, or, as the case may be, in front of the burner of a boiler or furnace as set forth above.

The combustion process, as shown and described above in various applications thereof, has the advantage that there is a considerable reduction of unburned and partial burned fractions, such as e.g. soot, carbon monoxide, olefins, etc. The emission of sulphur oxides is also reduced.

Because there is a decrease of the proportional amount of air entering the combustion chamber, there is also a reduction of the generated volume of nitrogen.

As mentioned earlier the inventive method can be embodied in many various combustion systems and furnaces or boilers. In such cases, the water vapor can be metered by a device adapted to the prevailing application, such as e.g. by a jet apparatus, turbulence generator, proportioning nozzle and similar.

Since many modifications, variations and changes in detail may be made to the described embodiments, it is intended that all matter contained in the foregoing description or shown in the accompanying drawings be interpreted as illustrative and not in a limiting sense.

Accordingly,

What is claimed is:

1. An improved combustion process comprising the steps of:
    (a) introducing a catalyst for promoting dissociation of water vapor into $H_2$ and $O_2$ into a combustion chamber;
    (b) adding water vapor to a fresh air and hydrocarbon mixture;
    (c) directing the fresh air and hydrocarbon mixture having water vapor added thereto into the combustion chamber having the catalyst for promoting dissociation of water vapor into $H_2$ and $O_2$ so that the catalyst will convert water vapor into $H_2$ and $O_2$; and
    (d) burning the fresh air and hydrocarbon mixture in the enriched atmosphere of $H_2$ and $O_2$.

2. An improved combustion process in which a combustible mixture including water vapor is carried out in the presence of a catalytic agent promoting dissociation of water vapor into $H_2$ and $O_2$ comprising the steps of:
    (a) directing a charge of fresh air toward a combustion chamber of an engine or like machine;
    (b) adding water vapor to the charge of fresh air;
    (c) mixing a hydrocarbon compound with the charge of fresh air, having water vapor added thereto, to form a combustible mixture; and
    (d) buring said combustible mixture in the presence of a catalytic agent promoting dissociation of water vapor into $H_2$ and $O_2$ in a combustion chamber.

3. The improved process of claim 2, wherein said catalytic agent comprises graphite and/or iron sponge.

4. The improved process of claim 2, wherein said catalytic agent comprises molybdenum compounds.

5. The improved process of claim 2, wherein said catalytic agent comprises a metal oxide and/or a metal hydroxide.

6. The improved process of claim 2, wherein said catalytic agent comprises a platinum sponge.

7. The improved process of claim 2, wherein said water vapor is produced by evaporating water through the agency of waste heat of the combustion process.

8. The improved process of claim 2, wherein the amount of water vapor added is controlled.

* * * * *